J. Church,
Working Rattan.
Nº 39,523. Patented Aug. 11, 1863.
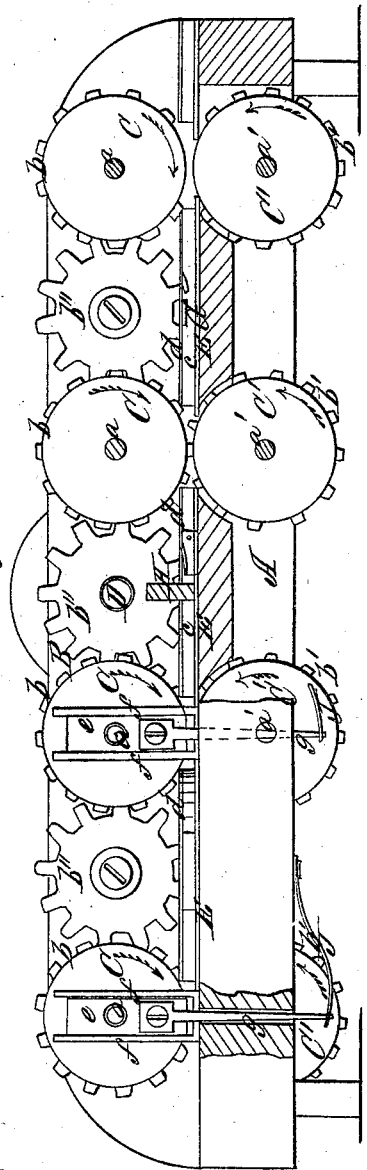
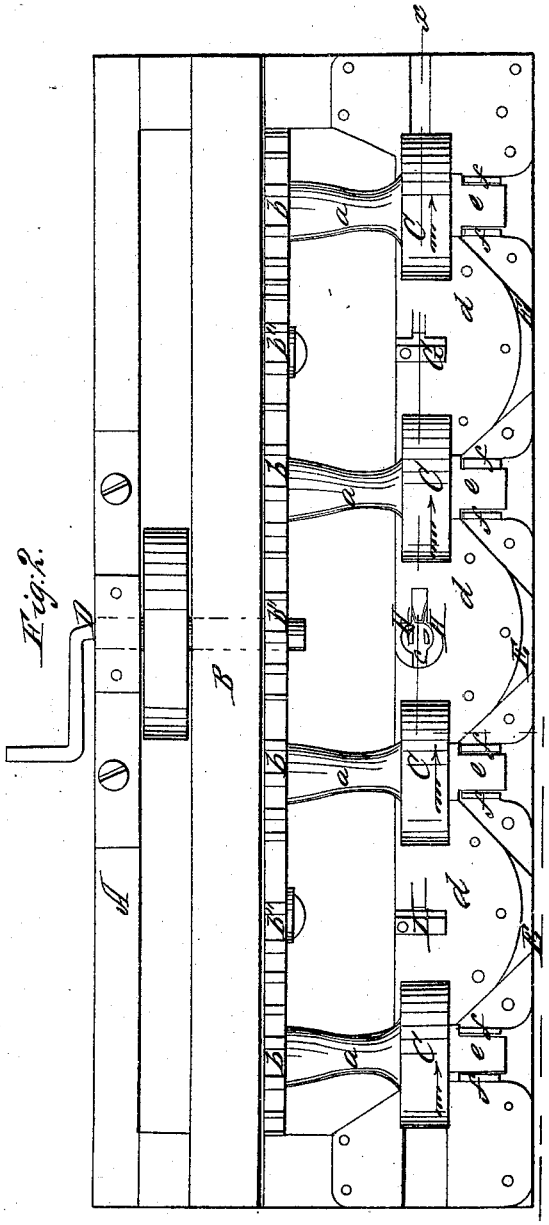
Witnesses:
Inventor:

UNITED STATES PATENT OFFICE.

JOSEPH CHURCH, OF CHESTER, ASSIGNOR TO J. N. RATHBUN AND E. F. BRANCH, OF RUTLAND, OHIO.

MACHINE FOR SHAVING CANES FOR WEAVERS' REEDS.

Specification forming part of Letters Patent No. 39,523, dated August 11, 1863.

*To all whom it may concern:*

Be it known that I, JOSEPH CHURCH, of Chester, in the county of Meigs and State of Ohio, have invented a new and useful Machine for Shaving Cane Splints for Weavers' Reeds; and I do hereby declare that the following is a full, clear, and exact description of the same, reference being had to the accompanying drawings, making part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention consists in the employment or use of a series of pairs of feed-rollers in connection with a series of pairs of knives arranged in such a manner that the cane will, at one operation, be shaved down to the original thickness and also reduced to a uniform width throughout.

To enable those skilled in the art to fully understand and construct my invention, I will proceed to describe it.

A represents a horizontal frame, which has a bar, B, attached longitudinally to it, extending its whole length and projecting some distance above it, the lower edge of said bar B being flush with the lower surface of the frame A.

C C' represent a series of pairs of rollers, which are placed on shafts $a\ a'$. These shafts, at one end, have their bearings in the bar B. The rollers C C' of each pair are placed one directly over the other, their shafts $a\ a'$ being in the same axial plane, and the shafts of each pair are connected by toothed wheels $b\ b'$, the wheels $b$ of the upper shafts, $a$, having wheels $b''$ interposed between them, which cause all the shafts and their rollers to move or rotate simultaneously, one of the wheels $b''$ being placed on a driving-shaft, D, through which motion is communicated to all the rollers.

On one side of the frame A there are secured a series of grooved plates, E, in line with each other. The grooves $c$ in these plates form a channel for the strips of cane to pass through, and said plates E are covered with thin metal plates $d$. These plates E E, are between the rollers C C' and in line with their "bite." The first plate E has a cutter, G, inserted in it, of chisel or planer form. This cutter has its edge in a horizontal position, and has not a great rake or set, as it is not designed to make a deep cut.

The second plate E has two cutters, H H, fitted vertically in it at a distance apart corresponding to the desired width of the finished strips of cane.

The third plate E has a cutter, I, fitted in it, which is precisely like the cutter G of the first plate E, but has a greater set or angle of inclination.

The outer bearings of the lower shafts, $a'$, of the rollers C' are in one side of the frame A, and are consquently fixed or immovable; but the outer bearings of the upper shafts, $a$, of the rollers C are in slides $e$, which are fitted between suitable guides, $ff$, and are connected by rods $g$ to springs J underneath the frame A, as shown in Fig. 1.

The above-described parts constitute the whole machine, the operation of which is as follows: The shaft D is rotated by any convenient power, and the rollers C C' are rotated in the direction indicated by the arrows. The strip of cane is inserted in one end of the channel $c$, and is passed into the bite of the first pair of rollers C C', which feed it underneath the first cutter, G, the latter taking off the soft spongy part of the cane, the strip of cane being fed into the machine with said soft springy surface uppermost. The cane then passes into the bite of the second pair of rollers, and is passed between the cutters H H, which reduce the cane to a uniform width throughout. The cane then passes into the bite of the third pair of rollers, and underneath the cutter I, which reduces the strip of cane to the required thickness. The rollers C C' are made to press against the strip of cane with a requisite pressure, in consequence of the springs J acting upon the slides $e$, in which the outer bearings of the upper shafts, $a$, are placed.

The device is extremely simple, has been practically tested, and operates in the most efficient manner.

Having thus described my invention, what I claim as new, and desire to secure by Letters Patent, is—

The series of pairs of feed-rollers C C', in combination with the cutters G H H I and plates E, provided with channel c, all arranged substantially as shown, to operate in the manner as and for the purpose herein set forth.

JOSEPH CHURCH.

Witnesses:
JANE ALLENSWORTH,
ALEXANDER HOGG.